US008265244B2

(12) United States Patent
Ropolyi (10) Patent No.: US 8,265,244 B2
(45) Date of Patent: Sep. 11, 2012

(54) CHARGING SPLIT NEGOTIATION IN IMS SESSIONS

(75) Inventor: Róbert Ropolyi, Budapest (HU)

(73) Assignee: Nokia Corporation, Espoo (FI)

( * ) Notice: Subject to any disclaimer, the term of this patent is extended or adjusted under 35 U.S.C. 154(b) by 1256 days.

(21) Appl. No.: 12/010,996

(22) Filed: Jan. 31, 2008

(65) Prior Publication Data
US 2009/0116627 A1    May 7, 2009

Related U.S. Application Data (63) Continuation-in-part of application No. 11/979,732, filed on Nov. 7, 2007, now Pat. No. 8,135,117.

(51) Int. Cl.
H04M 15/00 (2006.01)
G06Q 20/00 (2012.01)

(52) U.S. Cl. .................. 379/114.22; 370/468; 379/111; 379/114.01; 379/114.21; 379/130; 379/207.06; 455/3.06; 455/406; 705/33; 705/39; 709/201

(58) Field of Classification Search .................. 379/111, 379/114.01, 114.02, 114.03, 114.22, 130, 379/207.16, 114.12, 114.21; 455/3.06, 406; 705/39, 33; 709/201; 370/468
See application file for complete search history.

(56) References Cited

U.S. PATENT DOCUMENTS

| 4,879,742 | A | * | 11/1989 | Taniguchi et al. | ............. | 379/111 |
| 5,822,411 | A | * | 10/1998 | Swale et al. | ............. | 379/114.22 |
| 6,047,051 | A | * | 4/2000 | Ginzboorg et al. | ............ | 379/130 |
| 6,769,009 | B1 | * | 7/2004 | Reisman | ........................ | 709/201 |
| 7,076,037 | B1 | * | 7/2006 | Gonen et al. | ............. | 379/114.02 |

(Continued)

FOREIGN PATENT DOCUMENTS
EP        1 455 546 A1    9/2004
(Continued)

OTHER PUBLICATIONS

"Transaction management for sender/receiver-payment schemes in charging and accounting systems for interconnected networks," Junseok Hwang et al., Network Operations and Management Symposium, vol. 1, Apr. 19, 2004, pp. 569-582.

(Continued)

*Primary Examiner* — Gerald Gauthier
(74) *Attorney, Agent, or Firm* — Harrington & Smith (57) ABSTRACT

A method and apparatus for implementation of split charging in an Internet protocol multimedia subsystem, allowing subsystem users to negotiate at setup and at a modification of a session initiation protocol session which user will be charged for each multimedia component of the subsystem. A method includes transmitting a first message to a user equipment for initiating one of a multimedia call setup and a call modification, the first message including a split charging offer request and a first split charging ratio, and receiving a second message from the user equipment, the second message comprising a second split charging ratio. The method also includes processing the second message for determining whether a user of the user equipment accepted one of the multimedia call setup and the call modification, whether the user of the user equipment accepted the split charging offer request or the user offered an increase or decrease in the first split charging ratio, and whether a network element of an Internet protocol multimedia subsystem accepted, approved, and agreed upon the second split charging off ratio for allowing a group of users to negotiate which user will be charged for each component of the Internet protocol multimedia subsystem.

12 Claims, 5 Drawing Sheets

U.S. PATENT DOCUMENTS

| | | | |
|---|---|---|---|
| 7,145,994 B2 * | 12/2006 | Moreau et al. | 379/114.01 |
| 7,149,500 B2 * | 12/2006 | Halsell | 455/406 |
| 7,362,853 B2 * | 4/2008 | Halkosaari | 379/114.12 |
| 7,394,893 B2 * | 7/2008 | Brown et al. | 379/114.21 |
| 7,577,610 B2 | 8/2009 | Miyuki | 705/40 |
| 7,912,198 B2 * | 3/2011 | Zhang et al. | 379/207.16 |
| 8,135,117 B2 * | 3/2012 | Ropolyi | 379/114.22 |
| 2003/0083988 A1 | 5/2003 | Reith | 705/40 |
| 2003/0114142 A1 | 6/2003 | Brown et al. | 455/408 |
| 2004/0162737 A1 * | 8/2004 | Ikeda et al. | 705/1 |
| 2005/0021351 A1 * | 1/2005 | Koskinen et al. | 705/1 |
| 2005/0026558 A1 * | 2/2005 | Stura et al. | 455/3.06 |
| 2005/0113064 A1 * | 5/2005 | Halsell | 455/406 |
| 2005/0213721 A1 * | 9/2005 | Hakala et al. | 379/114.01 |
| 2006/0056607 A1 | 3/2006 | Halkosaari | |
| 2006/0209891 A1 * | 9/2006 | Yamada et al. | 370/468 |
| 2008/0281629 A1 | 11/2008 | Scott et al. | 705/2 |
| 2009/0083090 A1 | 3/2009 | Rolfes et al. | 705/7 |
| 2009/0116627 A1 * | 5/2009 | Ropolyi | 379/114.03 |
| 2009/0116628 A1 * | 5/2009 | Ropolyi | 379/114.22 |
| 2010/0080370 A1 | 4/2010 | Fiorentino | 379/114.03 |

FOREIGN PATENT DOCUMENTS

| | | |
|---|---|---|
| WO | WO 2004/086675 A1 | 10/2004 |
| WO | WO 2005/009021 A1 | 1/2005 |

OTHER PUBLICATIONS

Extended European Search Report for corresponding European Patent Application No. 09001196.6-2416, dated Jun. 24, 2009, pp. 1-8.

Office Action of corresponding European application No. 09001196.6-2416 dated Feb. 22, 2010, pp. 1-8.

International Telecommunication Union, Specifications of Signalling System No. 7, Stage 3 Descripion for Charging Supplementary Services Using Signalling System No. 7, Clause 3-Reverse Charging (REV), ITU-T Recommendation Q.736 (Oct. 1995).

International Telecommuncation Union, Digital Subscriber Signalling System No. 1, Integrated Services Digital Network (ISDN)—Stage 3 Description for Charging Supplementary Services Using DSS1, Clause 3—Reverse Charging, ITU-T Recommendation Q 956 (Oct. 1995).

International Telecommunication Union, General Recommendations on Telephone Switching and Signalling, Functions and Information Flows for Services in the ISDN, Stage 2 Description for Charging Supplementary Services, Clause 3—Reverse Charging (REV), ITU-T Recommendation Q.86 (Mar. 1993).

International Telecommunication Union, Integrated Services Digital Network (ISDN), General Structure and Service Capabilities, Reverse Charging, Recommendation 1.256.3 (Aug. 1992).

J. Rosenberg, Networking Group Request for Comments: 3311, Standards Track, The Session Initiation Protocol (SIP) Update Method, Sep. 2002.

ETSI TS 181 002 v1.1.1 (Mar. 2006), Technical Specification, Telecommuncations and Internet Converged Services and Protocols for Advanced Networking (TISPAN); Multimedia Telephony with PSTN/ISDN Simulation Services.

Rosenberg/Schulzrinne, Network Working Group Request for Comments: 3264, An Offer/Answer Model with the Session Description Protocol (SDP), Jun. 2002.

M. Handley et al., Network Working Group Request for Comments: 4566, SDP: Session Description Protocol, Jul. 2006.

H. Hakala et al., Network Working Group Request for Comments: 4006, Diameter Credit—Control Application, Aug. 2005.

P. Calhoun et al., Network Working Group Request for Comments: 3588, Diameter Base Protocol, Sep. 2003.

J. Rosenberg et al., Network Working Group Reqeust for Comments: 3261, SIP: Session Initiation Protocol, Jun. 2002.

3GPP TS 22.101 8.6.0 (Sep. 2007), Technical Specification, "$3^{rd}$ Generation Partnership Project; Technical Specification Group Services and System Aspects Service Aspects; Service Principles", (Release 8), (6 pages).

3GPP TS 22.115 8.1.0 (Sep. 2007), Technical Specification, "$3^{rd}$ Generation Partnership Project; Technical Specification Group Services and System Aspects Service Aspects; Charging and Billing", (Release 8), (21 pages).

3GPP TS 32.240 V8.0.0 (Sep. 2007), Technical Specification, "$3^{rd}$ Generation Partnership Project; Technical Specification Group Services and System Aspects; Telecommunication Management; Charging Management; Charging Architecture and Principles" (Release 8), (40 pages).

3GPP TS 32.260 V7.4.0 (Sep. 2007), Technical Specification, $3^{rd}$ Generation Partnership Project; Technical Specification Group Service and System Aspects; Telecommunication Management; Charging Management; IP Multimedia Subsystem (IMS) Charging (Release 7), (89 pages).

3GPP TS 32.299 V6.12.0 (Sep. 2007), Technical Specification, $3^{rd}$ Generation Partnership Project; Technical Specification Group Service and System Aspects; Telecommunication Management; Charging Management; Diameter Charging Applications (Release 6), (108 pages).

3GPP TS 24.229 V5.20.0 (Sep. 2007), Technical Specification, $3^{rd}$ Generation Partnership Project; Technical Specification Group Core Network and Terminals; IP Multimedia Call Control Protocol based on Session Initiation Protocol (SIP) and Session Description Protocol (SDP); Stage 3, (Release 5), (256 pages).

* cited by examiner

CHARGING SPLIT NEGOTIATION IN IMS SESSIONS

CROSS REFERENCE TO RELATED APPLICATIONS

This is a continuation-in-part application of U.S. patent application Ser. No. 11/979,732, filed on Nov. 7, 2007. The disclosure of the prior application is hereby incorporated by reference in their entirety.

BACKGROUND OF THE INVENTION

1. Field of the Invention

The present invention generally relates to the implementation of split charging (SPC) in an Internet protocol multimedia subsystem (IMS), and in particular, to methods and apparatuses for implementation of SPC in an IMS, allowing IMS users to negotiate at setup and at a modification of a session initiation protocol (SIP) session which user will be charged for each multimedia component of the session.

2. Description of the Related Art

The $3^{rd}$ Generation Partnership Protocol (3GPP) Stage 1 defines general requirements for charging in its technical services, TS 22.115 and TS 22.101. Specifically, TS 22.115 defines general requirements for applying charges flexibly to either the calling party or the called party, charging a third party for the session, allowing the splitting of charges among the calling party, the called party, and the third party, and charging according to the type of services and media used. Chapter 16 of TS 22.101 defines general requirements for alternate party charging. The general requirements include a provision for the chargeable party to be changed during the life of the call, and a provision stating that a user is charged for a call only after the user's consent to accepting the call is obtained. The user's consent may be obtained dynamically or through the user's service profile.

The European Telecommunications Standards Institute (ETSI) also defines general requirements for charging in their Telecons & Internet conveyed Services & Protocols for Advanced Networks (TISPAN) TS 181002, version 1.1.1, chapter 8.4.4, providing a requirement for support of reverse charging (REV) in the Next Generation Network (NGN).

The ITU Telecommunication Standardization Sector (ITU-T), which coordinates standards for telecommunications on behalf of the International Telecommunication Union (ITU), standardized REV as an integrated services digital network (ISDN) supplementary service, as outlined in ITU-T standards, 1.256.3 (stage 1), Q.86.3 (stage 2), Q.736.3, and Q.956.3 (stage 3, network and user signaling).

Four cases are defined in the aforementioned ITU-T standards.

The first case defines REV requested by a calling user at a call set-up time. In this first case, the service requested needs to be accepted by the called user.

The second case defines REV for the rest of the call, whereby the REV is requested by the calling user or the called user during the active phase of the call.

The third case defines REV for the entire call, whereby the REV is requested by the called user during the active phase of the call.

The fourth case defines an unconditional REV, which includes a subscription-based service for the called user.

The calling user must indicate his request for REV in the first and second cases, but not in the fourth case. In the first and second (where the REV request is initiated by the calling party) cases, the called user is presented with the REV request and active acceptance to the REV request is required. In the third and fourth cases, the called user is only informed about the request, which is automatically accepted; therefore, no acceptance of the requested REV is needed from the called user.

If the required service REV request acceptance is missing, the call will be cleared in the first and fourth cases, whereas the call with unaccepted REV request will continue unchanged in the second and third cases.

For a specific call, REV may only be invoked once. After a successful service invocation, any further request results in the call being cleared in the first and fourth cases, and the call with REV request continues unchanged in the second and third cases. However, an unsuccessful service invocation may be followed by a successful service invocation, even in the same case.

Further, service interworking has been defined for other ISDN supplementary services (SS), e.g. for call forwarding (CFW) services.

Therefore, as evidenced by REV being included in the 3GPP Stage 1, a clear business need has arisen for dynamic/static service options allowing IMS users to negotiate about and agree upon SPC for services in an IMS. Accordingly, what is needed is a method and apparatus for implementation of SPC in an IMS which allows IMS users to negotiate at setting up/during a SIP session which user will be charged for each multimedia component of the session.

SUMMARY OF THE INVENTION

The present invention provides methods and apparatuses for implementation of SPC in an IMS allowing IMS users to negotiate at setup and at a modification of a SIP session which user will be charged for each multimedia component of the session.

In accordance with one embodiment of the present invention, there is provided a method. The method includes transmitting a first message to a user equipment for initiating a call, the first message comprising a split charging offer request comprising a first split charging ratio, and receiving a second message from the user equipment, the second message comprising a second split charging ratio. The method also includes processing the second message for determining whether a user of the user equipment accepted the call, whether the user of the user equipment accepted the split charging offer request or the user offered an increase or decrease in the first split charging ratio, and whether a network element of an Internet protocol multimedia subsystem accepted, approved, and agreed upon the second split charging ratio for allowing a group of users to negotiate which user will be charged for each component of a system.

In accordance with another embodiment of the present invention, there is provided an apparatus. The apparatus includes a transmitter configured to transmit a first message to a user equipment for initiating a call, the first message comprising a split charging offer request comprising a first split charging ratio, and a receiver configured to receive a second message from the user equipment, the second message comprising a second split charging ratio. The apparatus also includes a processor configured to process the second message for determining whether a user of the user equipment accepted the call, whether the user of the user equipment accepted the split charging offer request or the user increased or decreased the first split charging ratio, and whether a network element of an Internet protocol multimedia subsystem accepted, approved, and agreed upon the second split charging ratio for allowing a group of users to negotiate which user will be charged for each component of a system.

In accordance with another embodiment of the present invention, there is provided a method. The method includes receiving a first message from a user equipment, the first message comprising a call initiation request, a split charging offer request, and a first split charging ratio, processing the first message, determining whether a network element of an Internet protocol multimedia subsystem accepted and approved the service usage for allowing a group of users to negotiate which user will be charged for each component of a system, and alerting a user of the call initiation request, the split charging offer request, and the first split charging ratio. The method also includes processing a user response to the call initiation request, the split charging offer request, and the first split charging ratio from the user, and transmitting a second message to the user equipment, wherein the second message indicates whether the user accepts the call initiation request, whether the user accepts the split charging offer request or the user increases or decreases the first split charging ratio.

In accordance with another embodiment of the present invention, there is provided an apparatus. The apparatus includes a receiver configured to receive a first message from a user equipment, the first message comprising a call initiation request, a split charging offer request, and a first split charging ratio, and a processor. The processor is configured to process the first message, determine whether a network element of an Internet protocol multimedia subsystem accepted and approved a second split charging ratio for allowing a group of users to negotiate which user will be charged for each component of a system, alert a user of the call initiation request, the split charging offer request, and the first split charging ratio, and process a user response to the call initiation request, the split charging offer request, and the first split charging ratio from the user. The apparatus further includes a transmitter configured to transmit a second message to the user equipment, wherein the second message indicates whether the user accepts the call initiation request, whether the user accepts the split charging offer request or the user increases or decreases the first split charging ratio.

BRIEF DESCRIPTION OF THE DRAWINGS

Further embodiments, details, advantages, and modifications of the present invention will become apparent from the following detailed description of the preferred embodiments which is to be taken in conjunction with the accompany drawings, in which.

DETAILED DESCRIPTION OF THE PREFERRED EMBODIMENTS

Reference will now be made in detail to preferred embodiments of the present invention, examples of which are illustrated in the accompanying drawings.

In accordance with an embodiment of the present invention, there is provided methods and apparatuses for implementation of SPC in an IMS, allowing IMS users to negotiate at setup and at a modification of a SIP session which user will be charged for each multimedia component of the session.

An offer/answer model provides service invocation in a session description protocol (SDP) exchange, whereby the offer may be sent by either the calling IMS user (calling party) or the called IMS user (called party).

A new SIP header conveys service specific information relating to the SPC service on a session level and on a media level. New Diameter attribute value pair (AVP) and call detail record (CDR) fields convey SPC information.

Home networks are implemented which may assure and inform IMS users of a successful service invocation, e.g. an offer/answer information exchange may be successful only if the home network will apply charges as agreed upon by the IMS users.

Application servers (AS) are implemented to provide automated service invocation for any IMS party.

In accordance with embodiments of the present invention, the relevant terms are defined as follows:

REV is defined as the calling party paying for the session or media component.

SPC is defined as a portion of communication charges are paid by the calling party, while another portion of the communication charges are paid by the called party. SPC according to embodiments of the present invention focus primarily on cases where REV is used for some or all of the media components of a SIP INVITE session, leading to SPC or REV for the session.

Charging split is defined as any possible way that the "charged party role" of a SIP call is distributed between the parties as opposed to dividing the charges in monetary terms, e.g. in case of a 50% charging split ratio, the calling party shall pay half of the price as he/she would pay in case of a "calling party pays" case, and the called party shall pay half of the price as he/she would be charged if he/she initiated the same call in the other direction. Additionally, a separate service fee for the SPC service may be charged.

Default charging split is defined as a distribution determined by tariff plans for the participating users of the IMS. In most cases, the default charging split means that the calling party will pay for the call. In case of call forwarding, the default charging split means that the called party pays for the "initial call leg" and the originally called party pays for the "forwarding leg."

The Internet Engineering Task Force defines the SIP and SDP protocols, the SDP offer/answer models, and the usage of an UPDATE method for negotiating the media set used in a SIP session in RFC 3261, RFC 4566, RFC 3264, and RFC 3311, respectively.

The 3$^{rd}$ Generation Partnership Program (3GPP) further defines session handling in IMS in TS 24.229. As previously noted, TS 22.115 and chapter 16 of TS 22.101 define the service aspects for charging, e.g. setting the high level requirements. TS 32.240 and TS 32.260 define the 3GPP charging architecture and principles, and the requirements for IMS charging, respectively.

RFC 3588, RFC 4006, and 3GPP TS 32.299 define the Diameter base protocol, the usage of Diameter protocol for credit control (CC), and the protocol requirements for 3GPP Diameter charging applications, respectively.

As previously noted, the ITU-T standardized REV as an ISDN supplementary service, as outlined in ITU-T standards, 1.256.3 (stage 1), Q.86.3 (stage 2), Q.736.3, and Q.956.3 (stage 3, network and user signaling).

Based on high level requirements set by 3GPP and ITU-T REV service requirements, the following are service definitions/requirements (service definition) in accordance with embodiments of the present invention:

First, service invocation by users is required. The calling and called users may be able to negotiate in each INVITE session how the charges applicable for that actual session are to be divided. The service invocation may be initiated both by the calling party and the called party by sending an appropriate service invocation request. For a successful service invocation, the receiving party should accept the service invocation request. This requirement is mandatory at least for the called party who takes over, e.g. a portion of charges and may be optional for the calling party who (according to calling party pays basis) does not take over any charges associated with the service invocation request.

The service invocation request may occur at session setup, at session modifications, and at any time during the active phase of the session. Multiple service invocations are allowed within a session. The IMS users should be able to re-negotiate the charging split at least after each session modification.

The IMS users may be able to specify the charging split, the time interval for which a new agreement is made, a validity of the service invocation, and a relevant charging split for SIP transactions initiated within the existing INVITE dialogue and payload carried by session-related SIP messages in the service invocation request.

The charging split is a ratio between 0% and 100% to which the called party is going to pay the charges for each media component included in the SIP session.

The time interval for which a new agreement is made may include either the next call period or the entire session duration, covering the period before the service invocation. The next period may last from the time of invocation until a further SPC negotiation, a session modification, or until the end of the session. A request of SPC for the entire session duration should only be used if it is requested for all media, e.g. a 100% ratio, indicating the called party is going to pay for all media components associated with the session. This type of SPC service invocation should only be used once in a session.

Validity of the service invocation (and a relevant split) for SIP transactions initiated within the existing INVITE dialogue and payload may be carried out by session-related SIP messages. If this option is selected, the payload and transactions may be charged according to the defined split ratio, irrespective of the sender/receiver.

Second, an automated service invocation based on a subscription option of the called user must be supported. AS, e.g. the service domain, provide the automated service invocation. The served party for whom the AS invokes the SPC automatically must be informed about that service invocation and also about unsuccessful service invocation.

Third, operators need to be able to provide the SPC service on a subscription basis, i.e. the service invocation needs to be enabled (as the called party or, as another service option, also as the calling party) only if the user has subscribed for the SPC. Operators need to also be able to block the service usage if the billing (of IMS users) and accounting (between operators) can not be provided according to modified charging conditions.

Fourth, service interworking needs to be provided with other value added services, such as call forwarding, advice of charge (AoC) if standardized for IMS, and alternate party charging, which is currently being standardized for IMS.

As requested in the service definition, any of the IMS users must be able to initiate the service invocation and the other party, or at least the called party, needs to be able to accept or reject the service invocation request. To satisfy this requirement, the SPC-related signaling may become an integral part of the session setup/session modification mechanism, whenever the service invocation is connected to session setup or session modification, an existing session modification mechanism, re-INVITE method, is to be used if the service invocation is made during an active session even if the media set is not changed. Further, the offer/answer model needs to be followed for the SPC offer and answer, whereby at least one offer/answer needs to be made during the session setup or modification to allow IMS users to make a request and accept or reject the request.

In order to ensure that the negotiation is in sync with the media content (which itself changes during session setup or session modification), i.e. the negotiation is always clearly defined and agreed upon in which ratio the parties will bear the charges for each media component, the charging split modification must be bound to the negotiation about the media components themselves. A loosely coupled SDP and SPC information exchange must ensure that the charging split ratio is always given for all the media. In real human environments, the synchronism between the SPC offer/answers and the media content may be kept in a way that the SPC offer is made for each media connection that is part of the SDP. This will guarantee that there will be a valid ratio defined for all media connections in use after the setup/modification.

The charging split offer contains information on session level and media level. Specifically, the session level information may contain the "step" in the service invocation, i.e. the offer and the response given by the other party (offer accepted or rejected), the relevant time period, e.g. "next period" or "total session duration", and validity for transactions and payloads, e.g. yes or no.

The media level information may contain information related to the requested ratio of overtaking the charges. For example, 0% means default charging split with the calling party paying, i.e. SPC is not invoked, while 100% means REV for that media component. Media level information may be present for each media component (and if signaled as valid, for the payload and transactions), or the media level information should not be present at all. If no media level information is present, the offer has to be interpreted as an offer affecting all media with 100% charging covered by the calling party, i.e. REV is requested for all media components.

The SPC answer may not contain a "new offer." If the calling party makes a split charging offer, the called party's acceptance indicates that he/she is ready to take at least as high a ratio of the charges for each media component as there was in the offer. Similarly, if the called party makes the SPC offer, the calling party's acceptance indicates that he/she sends an answer with a similar or lower ratio, indicating that the calling party takes at least as high a ratio of the charges as proposed by the called party.

An alternative variant of the SPC service may include that the offer may be accepted only as it is, i.e. ratios cannot be changed. This leads to a less flexible, but easier and more understandable service. If the answerer cannot accept the offer with the aforementioned criteria, he/she must reject the offer. An answer that does not meet the defined criteria is to be considered by the offerer (and by the network) as a rejection. Note that SPC may influence the media set negotiation. The media set of the session should not be considered as agreed upon if there is no agreement reached about the charging split.

If an SPC offer was made during session setup and no agreement was reached, the session must be terminated. If an SPC offer was made in a re-INVITE and no SPC agreement can be reached, the re-INVITE transaction needs to be terminated and the session is to be continued unmodified.

In accordance with an embodiment of the present invention, there is provided an automated service invocation handled by an AS, which is configured to accept the SPC offer or make the SPC offer. The AS may implement all the relevant requirements set in the aforementioned service definition for a user equipment and also those set for the home network. The AS implements the aforementioned service definition in a proxy mode by inserting SPC-related information into existing messages sent by IMS users. To avoid a situation where both party's AS attempt to make an offer, for an AS that is configured to send SPC offers, it is mandatory to support answering received SPC offers.

At least the following types of services should be enabled in the AS: automatic acceptance of the SPC request with maximum allowed ratios, including 100%, i.e. REV for a predefined set of calling users, automatic SPC request needs to be provided with a pre-set charging split ratio for sessions that include a certain set of media components for calls arriving from a predefined set of calling users, and automatic acceptance of SPC requests from any called user.

Split charging for non-session-related SIP transactions may be enabled by the automated service invocation. For using SPC for such transactions, automated invocation is a mandatory requirement on the terminating side, as the user cannot give an answer without the SIP request being delivered to the user equipment.

In accordance with an embodiment of the present invention, the session level information of the SPC offer/response is included in a SIP signaling.

Accordingly, the SIP parameter used for the "session invocation step" may have at least the following values: "offered," "accepted," "rejected," "rejected by end user," "rejected by network," "rejected offer," "answer to rejected offer," and optionally, additional information may be used for signaling the reasons/conditions why the network is unable to allow the SPC feature.

"Offered" indicates that the sending party intends to reach a non-default charging split agreement. All the other SPC-related information elements in the same request are to be interpreted as offered values.

"Accepted" indicates when a received offer is answered by the IMS user or by an AS implementing an automatic service invocation. When this value is received by the offeror, he/she (and also his/her home network) may consider the charging split has been agreed upon, whereby the session charges are to be split from this point onward or for the whole session exactly as was defined in the offeree's answer.

"Rejected by end user" may also be used as an answer to an offer, by the IMS user or the AS. This value indicates that due to a lack of consent by the other party, the session cannot be set up or modified according to the charging split in the offer.

"Rejected by network" is a value to be set by the IMS (or NGN) network only. A call session control function (CSCF) or an AS may set the value and may be used in the same message as the value "Accepted".

"Rejected offer" is a value which may be used by a home network element that receives an SPC offer in a response message that must be forwarded (in order to comply with SIP session/transaction handling), but the serving network element needs to reject the SPC offer itself. Subsequently, the value "Offered" should be replaced with this value.

"Answer to rejected offer" is a value indicating an answer to "Rejected offer" when that value is received.

Optionally, additional information may be used for signaling the reason/conditions why the network does not allow the SPC feature. A preferred solution is using existing SIP headers, e.g. the SIP Reason header for the additional information.

The payload/transaction-related parameter may be included only in the messages that carry the SPC offer. The same applies to the parameter used for the time interval for which the SPC is invoked.

The media component level information, beyond identifying the media component, may carry a number between 0 and 100, defining (for the given media) the ratio of charges that the called party will cover.

For encoding the media component level information, two alternatives are presented: First, the media component level information may be included into the same SIP header(s) as the session level information. In this scenario, identification of the media component may be identified by a list order within the SIP parameter, e.g. the first information related to the media component of which description appears first in the SDP and so on. If the payload/transaction is to be included, the number belonging to it may be added to the end of the list.

The media component level parameter(s) may be made optional. If the media component level parameter(s) is omitted in a request, the request should be interpreted as a REV request for all media. Further, if the media component level parameter(s) is omitted in the response, acceptance of the offer is with charging split ratios having values identical to those values provided in the offer. However, if the media component level parameter(s) is present in an offer/answer, it must define the requested SPC for each media, i.e. it needs to contain exactly as many basic information elements as the number of media components appearing in the SDP sent in the same SIP message, and an additional one for the payload/transaction, if requested. SPC offers/answers not fulfilling this requirement are to be considered as invalid and the session setup or modification must be terminated.

The other option for encoding the media component level information is to use SDP itself. The media-level SPC information may appear in each media description section. For backward compatibility, the SPC-related information may be encoded into a new type of "a" line. Values, such as "a=charging-split-ratio-X", $0 \leq X \leq 100$, may be used. If SDP is to be used, either all or none of the media description sections present in SDP may contain the SPC related "a" line. SPC offers/answers not fulfilling this requirement should be treated as invalid. The payload/transaction related SPC ratio should still be included in the SIP. Using SIP alone is the preferred option, which is discussed in further detail below. Irrespective of the (partial) use of SDP for encoding, the SPC-related information could be encoded into SIP messages either by using a new SIP header or extending an existing SIP header for this purpose. For backward compatibility reasons, using a new header, such as a End-User-Charging-Information (EUCI), is considered a preferred option.

In a mobile network operator's environment, the introduction of SPC sets additional requirements.

The network operator must be able to prohibit the use of the service for IMS users who have not subscribed for the services. This can be ensured either by a serving call session control function (S-CSCF), or for complex, media dependent service rights by an AS. For prepaid users, also the online charging function (OCF) may play such a role.

For blocking of the SPC invocation, standard SIP-proxy actions may be used. A negative final response may be sent to a SIP request carrying an SPC request. For example, the negative final response may include "488 Not acceptable here," optionally with a SIP-Reason header carrying additional information.

The content of the SIP offer or answer may be changed to prevent the IMS users from reaching an agreement in the charging split. For example, changing the SPC answer from "Accepted by end user" to "Rejected by network," or changing the SPC offer from "Offered" to "Rejected offer". This latter option may be used if a SIP-Response that needs to be forwarded, carrying an SPC offer. The user equipment (UE) receiving the "Rejected offer" has to return "Answer to rejected offer" to be treated similarly to "Rejected by Network".

If an SPC answer in 200 OK final response needs to be blocked, the 200 OK and the subsequent ACK must be forwarded, but the session needs to be terminated by a transparent back-to-back release.

If the control is given to the online charging server (OCS), it may give instructions to the S-CSCF that lead to the above mentioned SIP message handling.

A precondition to allow the invocation of SPC service in a multi-operator environment is that the inter-operator accounting between the involved operators handles the invocation of SPC service correctly. The relevant charging data must be collected and processed accordingly. The networks (IMS nodes) must identify each other as supporting the SPC. The S-CSCF may make a decision based on local configurations and based on analyzing the calling/called party's domain or based on the received type-2 Inter-operator-Identifier (IOI) parameter.

The latter option is to be preferred, but not possible according to the current 3GPP standards. To enable this option, the terminating-IOI should be sent in the first reliable preliminary response (as opposed to 200 OK). If SPC is used, a portion or all of the charges are collected by the terminating network operator. This may change the direction of money flow between the operators. Inter-operator accounting may be made on a media component level. For example, if 60% was signaled for a media component, 40%-60%=−20% of the "total accounting share" defined for that media component type should be paid by the calling party's operator, i.e. the terminating network operator pays 20% of the value they would receive in the "calling party pays" scenario.

Roaming accounting may also be affected by the SPC feature, insofar as the roaming agreement defines different fees for originating and terminating calls. This is, however seen as less relevant; therefore, requirements are set for the home network/S-CSCF for ensuring the SPC service. Nevertheless, based on the solution described here, similar mechanisms may be defined by a person skilled in the art for a proxy call session control function (P-CSCF) as well.

In order to ensure that SPC offer/answer information is forwarded by IMS nodes that do not support SPC, i.e. are not compliant with the 3GPP release that introduces SPC, a new SIP header may be defined/used for SPC. For example, an End-User-Charging-Info header which also may carry AoC information may be used.

On the other hand, the end users should be assured by the network that if their UEs signal a successful service invocation, the charges will applied as agreed upon by the parties. This can be ensured only if the SPC information is modified by the "responsible network elements" (S-CSCF or AS, see above) while the offer/answer passes through the network. The handling of the offers and the answers must be extended to reflect this modification, as discussed below.

An option for the needed modification of the SPC-related header is if the S-CSCF adds a token to the SPC information, when forwarding SIP requests/responses towards the served UE. The UE may handle a SPC offer or response to be valid only if this token is present. To prevent any malicious use, the token may be generated by the S-CSCF based on a common shared secret. A possible option is to generate the token using the last nonce sent in the re-registration process.

As a preferred option, operators may assure each other about the detection and support of SPC in the actual session. A good solution is to exchange a "network-internal" token between the involved S-CSCFs. A token may be sent in the SPC offer and received in the SPC answer. This may also signal that all the relevant conditions are met in the partner network to support SPC in the current session. Each S-CSCF forwards the SPC offer/answer (without setting a rejecting value) if this token is received. For security reasons, this token may be generated based on information shared only among the trusted networks processing the session. An IM CN Subsystem Charging Identifier (ICID) is a good choice for that. (If the SPC service support is extended to the visited network, P-CSCF's "assurance" for SPC support is needed. For that, a similar token may be exchanged between P-CSCF and S-CSCF serving the same user.)

In case of non-session-related SIP transactions, the SPC negotiation between the IMS users is not possible. The SPC offer may be sent from the senders' side, where the acceptance in the terminating network must be done by an AS. The terminating S-CSCF may send a negative response to any transaction received with an SPC offer, unless it invokes (based on the served user's profile) an AS that can accept/reject the SPC offers. Note that if neither the originating nor the terminating network supports SPC, the SIP request will be delivered and charged for the sending user.

As a generic alternative for service implementation, SPC offers/answers may be checked and charged exclusively by application servers, i.e. the requirements set above for S-CSCFs would be "moved" to ASs. Naturally, the same "SPC AS" may be then responsible for the automated service interworking as well. In such a solution, operators may configure this "SPC AS" to be invoked for all sessions/transactions of those IMS users who would like to use SPC. The "SPC AS" may be invoked by a S-CSCF preferably after all other ASs, so that it can make charging on the final request-URI (URI: Unified Resource Identifier). Type 2 inter-operator identifiers (IOI) may be forwarded to the "SPC AS" and an authentication with the IMS users (assurance of using SPC service) may be solved. All other requirements set for the S-CSCF may be implemented by an AS. It should be ensured that the charging in the S-CSCF is suppressed, e.g. based on a service identifier assigned for SPC.

To provide a seamless interworking between the IMS and circuit-switched (CS) domain, it should be possible to use REV in IMS-originated and IMS-terminated CS calls. The service interworking needs to be implemented in a media control gateway function (MGCF).

SPC information may be used with parameter values matching the REV. The ratio for the single media connection present in SDP needs to be used as 100%. The relevant period for SPC invocation may be both, "whole session," which matches the aforementioned third REV case, and "next period," which is applicable for the aforementioned first, second, and fourth REV cases. Any other service options/ values should be rejected by the MGCF, if an IMS user makes a SPC offer. The aforementioned first, second, third, and fourth REV cases may be matched to the service options of SPC, provided that the AS and UE in the IMS side use a proper SPC ratio, i.e. 100%.

The service interworking with SPC may include different versions of call forwarding, e.g. unconditional or only if the user is busy (sends final response "486 Busy here"). Similar to the REV service, SPC may be interpreted/used on a per leg basis because the IP multimedia services are expected to be charged leg-based as well. If the calling party sends an SPC offer, either at the call setup or in a modification, that offer may be accepted only by an AS in the forwarding party's network. Similarly, if the called party makes a SPC offer, it may be considered relevant only for the forwarding leg, and it may be accepted only by an AS in the forwarding party's network. If an operator wants to provide SPC service in combination with call forwarding, they may configure the S-CSCF to invoke an AS that handles SPC on the call legs both before and after the AS that potentially makes call forwarding for the terminating call.

Charging data collection needs to be extended to collect, store charging data, and calculate the tariff rate in accordance with the agreed (non-default) charging split. Charging may occur offline or online.

Offline charging does not set any limitation to the SPC invocation. The SPC-related information may be included in the charging data collected by the charging trigger function (CTF). This is mandatory for S-CSCFs, MGCFs, and ASs that provide value-added services for SPC (automatic service invocation). If SPC support is extended to the visited networks as well, the same are relevant for P-CSCFs as well (for roaming accounting purposes).

The following table specifies information elements to be stored in CDRs. In accordance with 3GPP TS 32.260, $O_C$ represents here "Operator Provisionable: Conditional"—a field that operators have provisioned to be included in the CDR if certain conditions are met.

| Information element | P-CSCF | S-CSCF | MGCF | AS |
|---|---|---|---|---|
| SPC invocation period (next period/whole session) | Oc | Oc | Oc | Oc |
| SPC ratios | Oc | Oc | Oc | Oc |
| Automated SPC service invocation (none/automated offer/automated answer) | — | — | — | Oc |

The SPC ratios need to be stored as part of the media component-related CDR field, i.e. separately for each media component. Note that the invocation step is not to be recorded, but e.g. "rejected by network" value, may be reflected by a cause code. Payload relevance implicitly appears because the SPC ratio is stored for payload/dialogue-internal transaction charging data.

Requirements for CDR generation may include a partial CDR which needs to be generated if the SPC is invoked during the call. To enable the CDR generation also for the "pure" SPC mid-session invocation, the CTF may send an Accounting Request (ACR) when the SPC invocation is finished successfully.

Each partial CDR may contain the SPC ratios that were valid during the period that ends at the generation of that CDR. If a partial CDR is generated for any other reason than SPC invocation, the next partial CDR may store the same SPC ratios. The invocation period does not need to be stored if "period=whole session" was stored in previous partial CDR. Special care needs to be taken that an SPC invocation for the whole session overwrites the ratios that were valid in previous periods and are contained in partial CDRs generated for those periods. The payload-related information may be stored in Message Body elements if SPC was invoked for payloads/messaging, but the relevant SPC ratio needs to be added there. On the other hand, the "Originator" field becomes superfluous. Charging information about the SIP transactions that use the same INVITE dialogue may be stored in separate CDRs, but they may contain the relevant SPC ratio in the IMS-information level. The same applies to the independent non-INVITE transactions if they are processed by the network using automatic SPC acceptance.

The CTF may transfer all the relevant SPC-specific charging information to the CDF; therefore, the ACR message contents need to be extended. The affected Diameter Attribute-Value Pairs (AVPs) may include IMS Information, SDP-Media Components, Message-Body, and Service-Specific Data.

IMS-Information: a new AVP which needs to be part of it and encodes the SPC invocation period. The SPC ratio for payload/messaging needs may be included in the IMS information in the ACR messages (and CDRs) that are generated for the SIP transactions within the INVITE dialogue. SDP-Media-Component: it needs to be extended with a new AVP for the SPC ratio. Message-Body: it also needs to be extended with an AVP for the SPC ratio. It contains the ratio for payload/messaging for payloads in sessions/during session phases. Service-Specific-Data: Service-Specific-Type AVP may have a value that represents the automated SPC invocation. Service-Specific-Value AVP may contain any detailed information for that, if needed.

Online charging/CC limits the SPC service invocation. The OCF may enable/disable the served user to take over charges for certain media types. Naturally, the available credit on the served user's account may also represent a limitation.

The strongest limitation set by the CC mechanism/quota handling is that invocation of SPC with the period for an entire session cannot be guaranteed. This is partly because the quota assigned for a calling user at the session setup may have been already exhausted before the SPC service invocation, and partly because the terminating user should pay additional charges for a quota reservation where reporting cannot be done after the period.

CC sessions need to be handled in a different way than it is defined currently in 3GPP standards. Without having SPC, for the terminating sessions, the S-CSCF either does not initiate a CC session or if it does, the OCF will terminate it in most cases. Then, a CC session may be opened when the SPC offer is received. The CC handling of payload and SIP transactions sent within the INVITE dialogue may be integrated into the same CC session that handles the INVITE session. Even if these are handled separately, Credit Control Requests (CCR) have to contain the SPC ratio that was agreed upon for them. If SPC is invoked for a standalone SIP transaction, the SIP transaction may be charged using an Event Charging with Unit Reservation (ECUR) mechanism.

The content of the CCR messages may be extended to carry the SPC-related information. As it follows from the 3GPP online charging specifications, only S-CSCF and AS are affected. The "period" parameter of SPC invocation does not need to be included, but all the other AVPs defined for the offline charging above are to be used in CCR requests as well.

Figure 1:
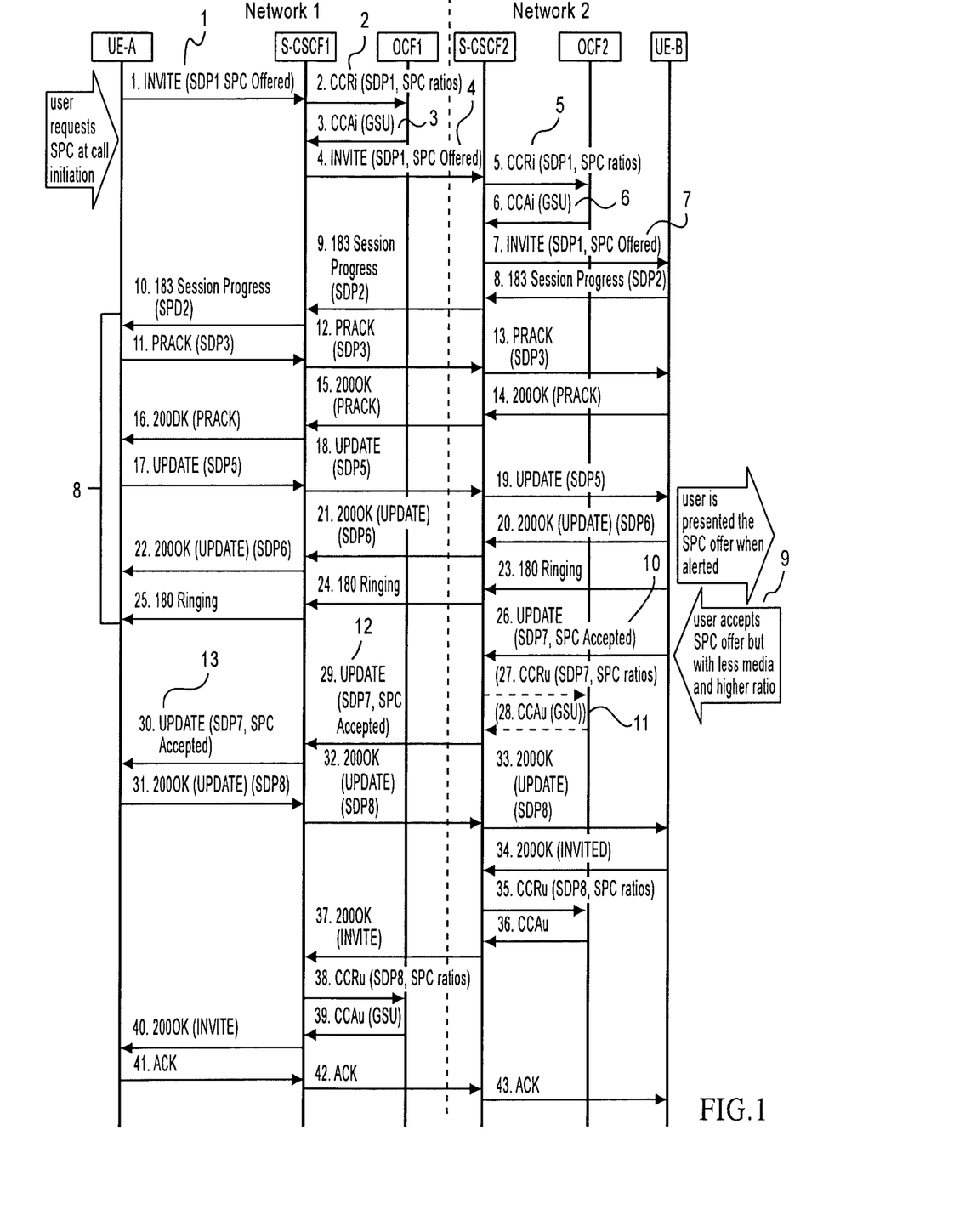
FIG. 1 illustrates a signaling flow for a successful session setup with a SPC service invocation by a calling user according to an embodiment of the present invention.
Figure 2:
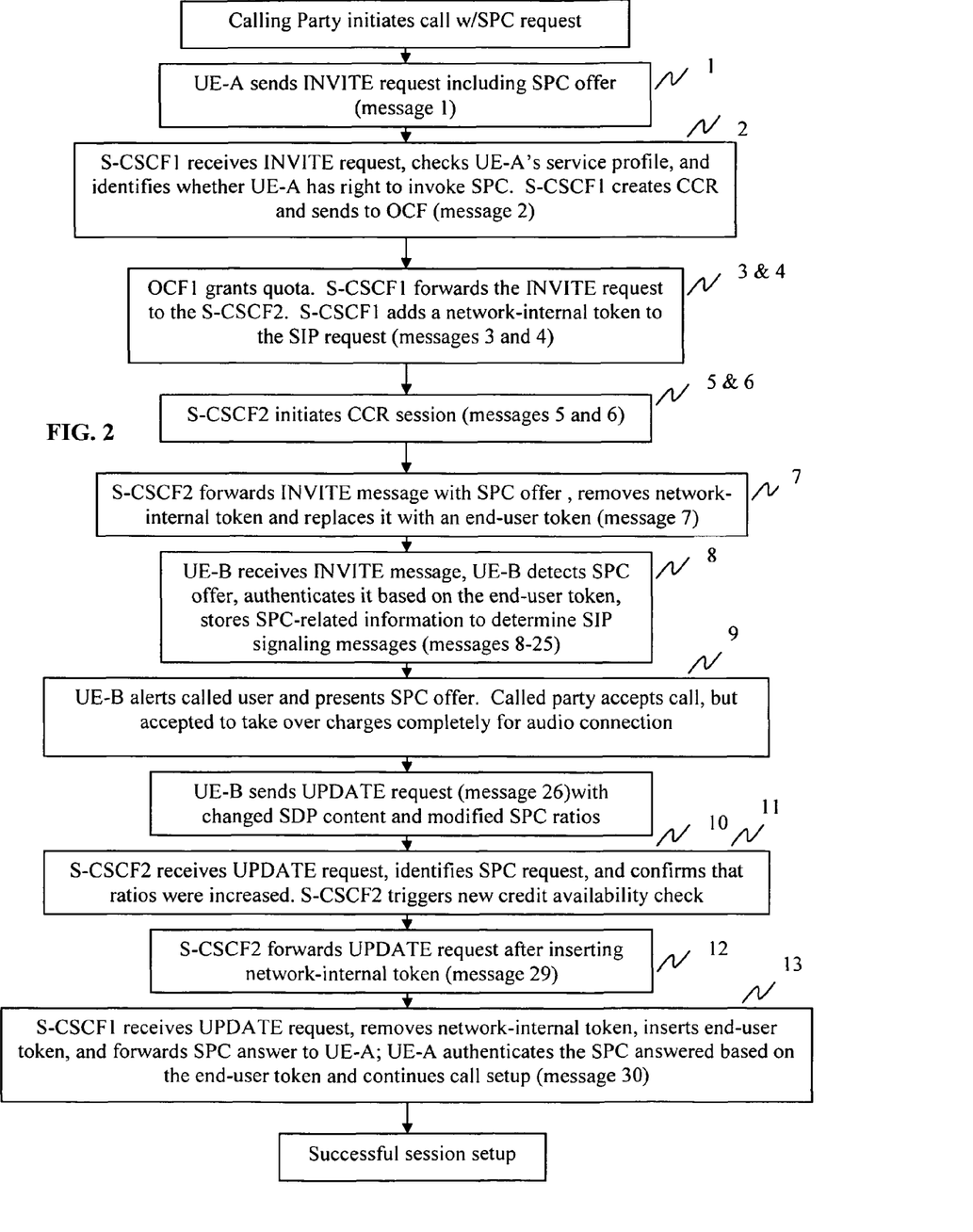
FIG. 2 illustrates a flow diagram for the successful session setup with a SPC service invocation by a calling user according to an embodiment of the present invention.

FIG. 1 illustrates a signaling flow for a successful session setup with a SPC service invocation by a calling user according to an embodiment of the present invention. FIG. 2 illustrates a flow diagram for the successful session setup with a SPC service invocation by a calling user according to an embodiment of the present invention.

Referring to FIG. 1 and FIG. 2, a possible signaling flow is illustrated for a case when a calling IMS user makes an SPC offer and the SPC offer is successfully answered/accepted by the called party.

In step 1, a calling party/user requests a SPC at a call initiation, whereby a UE-A sends an INVITE request including a SPC offer in which the UE-A requests the called party to take over 50% of charges for both a video and an audio media component included in a SDP (message 1). A parameter "payload" may be omitted from the SPC offer as the default value is considered to "Not Relevant." In this embodiment, the SPC-related information is encoded into a new SIP header, called End-User-Charging Information (EUCI).

In step 2, a S-CSCF1 receives the initial INVITE request, checks the UE-A's service profile, and identifies whether the UE-A has a right to invoke the SPC. As the UE-A is charged by an online mechanism, a CCR is created and sent to the OCF (message 2). In that request, both SDP-Media-Component fields may contain SPC ratios that refer to that component in a EUCI header, while a SPC-Invocation-Period may be included in the IMS-Information AVP.

In steps 3 and 4, the OCF1, as an answer to the CCR request (message 3), grants a quota. This granting allows the S-CSCF1 to forward the INVITE request (message 4), but before forwarding the INVITE request, the S-CSCF1 adds its network-internal token to the EUCI header based on the ICID the S-CSCF1 has received from an originating P-CSCF, and transmits it to S-CSCF2. When the S-CSCF2 receives the INVITE request, S-CSCF2 checks the authenticity of the token received from S-CSCF1 and identifies that the originating network will support the SPC that was requested by the UE-A. S-CSCF2 also checks, based on a type-2 originating IOI received in a P-Charging-Vector header that is based on an interconnection agreement with the originating network operator, that an inter-operating accounting with the calling party's operator is arranged correctly.

In steps 5 and 6, the S-CSCF2 initiates a CCR session, in which OCF2 assigns the quota for the session (messages 5 and 6). This CCR has to contain the aforementioned SPC-related AVPs as well.

In step 7, as all conditions are met, S-CSCF2 may forward the INVITE message with the SPC offer (message 7). However, before forwarding the INVITE message, S-CSCF2 removes the SPC-token received from S-CSCF1 and inserts an end-user token based on authentication information shared with the served user.

In step 8, when the UE-B receives the INVITE message, UE-B detects the SPC offer, and based on the token, also detects that the INVITE message was approved by its own S-CSCF. It is assumed that UE-A has required in the SDP that the called party is alerted only after the preconditions for resource reservations are met. Therefore, UE-B does not alert the called party yet, but stores the SPC-related information because further signaling is needed in order to meet the preconditions for the resource reservation. This determines the SIP signaling messages (messages 8-25).

In step 9, when the resource reservation is confirmed, UE-B alerts the called user and, in addition to the offered media connections, presents the SPC offer. Optionally, the UE-B may provide an opportunity to increase the charging split. In this embodiment, it is assumed that the called user has accepted the session only with the audio connection, but accepted to take over the charges completely for the audio connection.

In step 10, as a consequence, UE-B may send an UPDATE request (message 26) with changed SDP content and modified SPC ratios. There still may be two numbers included in the SPC ratio, but the one relevant for the inactivated video connection is irrelevant. The other number is relevant for the audio connection and denoted as 100, e.g. 100%, showing that the called user is ready to pay for the call with the remaining audio component alone.

In step 11, S-CSCF2 receives the UPDATE request from the called user and identifies that the SPC was accepted, and the ratios were changed. The S-CSCF2 checks whether the radios were increased/equal to the ones in the SPC offer and confirms that the ratios were indeed increased. At this point, S-CSCF2 triggers a new credit availability check (messages 27 and 28) to identify whether the called user's credit is satisfactory with the modified ratios. However, this is only optional as the credit availability will be checked at 200 OK, provided that the call setup is successful.

In step 12, S-CSCF2 forwards the UPDATE request (message 29) after inserting a network-internal token again, generated based on the ICID that was received/stored for the session. Herewith, the terminating network signals to the originating network that it has accepted/approved the SPC service invocation and will apply user and interoperator charging accordingly.

In step 13, when S-CSCF1 receives the UPDATE request, S-CSCF1 identifies, based on the EUCI header's content, that the terminating network supports SPC for this session. As it has already received type-2 IOI in the first reliable provisional response, 183 Session progress, S-CSCF1 may also be able to check that the interconnection agreement covers SPC. S-CSCF1 then forwards the SPC answer to UE-A (message 30), but only after replacing the network-internal token by an end-user token.

When the UE-A receives the SPC answer, UE-A presents the SPC answer to the calling user that the called party has removed the video connection but it has taken over the call charges completely. From the end-user token it also detects that the participating networks support the SPC service, so the SIP session will be indeed (in this case) free of charge for the called party. The UE-A may inform the user about this.

The remaining messages 31-43 illustrate that the session is setup successfully. Unless a modification is made later, the called user is going to pay for the call with the same tariff that would be applicable if the called user had called the current calling user, including an audio connection only. Note that the billing domain of both operators is informed about the invocation of SPC, which allows the operators to charge an additional service invocation fee to the calling user and/or the called user.

Figure 3:
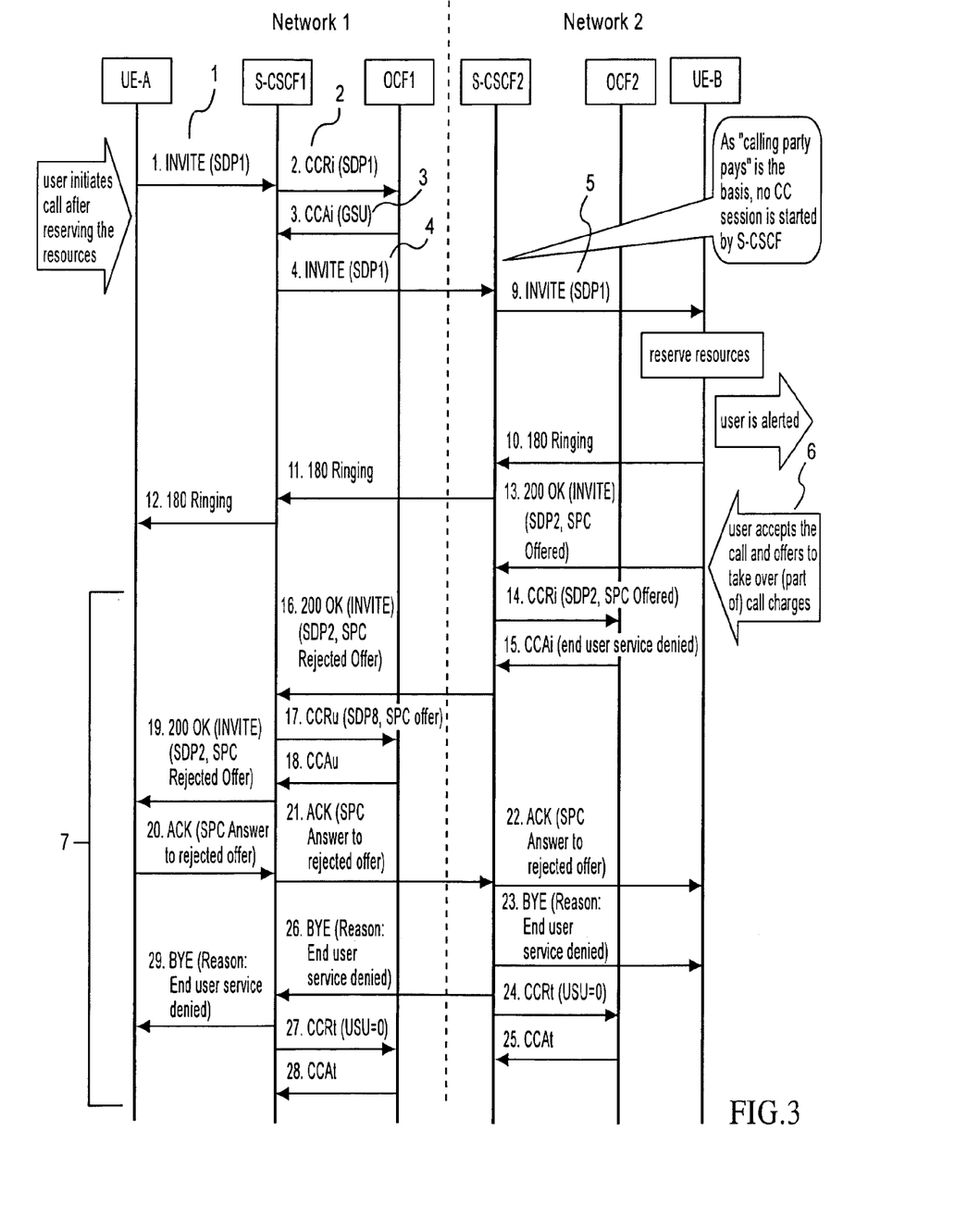
FIG. 3 illustrates a signaling flow for an unsuccessful SPC service invocation by a prepaid calling party having no service subscription according to an embodiment of the present invention.
Figure 4:
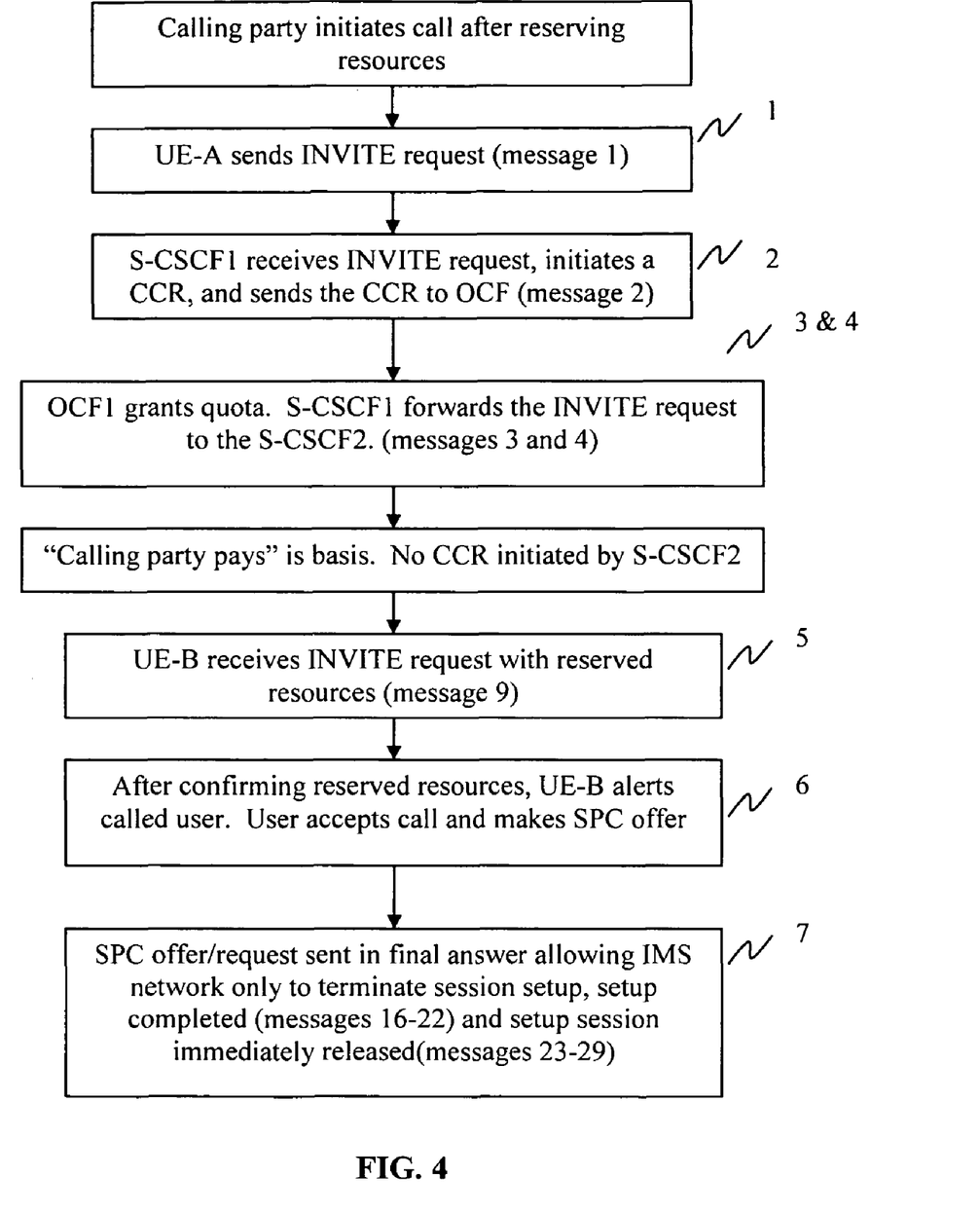
FIG. 4 illustrates a flow diagram for an unsuccessful SPC service invocation by a prepaid calling party having no service subscription according to an embodiment of the present invention.

FIG. 3 illustrates a signaling flow for an unsuccessful SPC service invocation by a prepaid calling party having no service subscription according to an embodiment of the present invention. FIG. 4 illustrates a flow diagram for an unsuccessful SPC service invocation by a prepaid calling party having no service subscription according to an embodiment of the present invention.

Referring to FIG. 3 and FIG. 4, a possible signaling flow is illustrated for a case when the called party makes a SPC offer, but is not allowed to make the SPC offer because the called party lacks a subscription for SPC. The lack of subscription is detected at the OCF, which answers the CCR with an appropriate Diameter response code, (DIAMETER_END_USER_SERVICE DENIED).

In step 1, a calling party/user initiates a call after reserving the resources, whereby a UE-A sends an INVITE request (message 1). The parameter "payload" may be omitted from the SPC offer as the default value is considered to "Not Relevant."

In step 2, a S-CSCF1 receives the initial INVITE request, initiates a CCR, and sends the CCR to the OCF (message 2).

In steps 3 and 4, the OCF1, as an answer to the CCR request (message 3), grants a quota. This granting allows the S-CSCF1 to forward the INVITE request (message 4), but before forwarding the INVITE request, the S-CSCF1 adds its network-internal token to the EUCI header based on the ICID the S-CSCF1 has received from an originating P-CSCF, and transmits it to S-CSCF2. When the S-CSCF2 receives the INVITE request, S-CSCF2 checks the validity of the token received from S-CSCF1. S-CSCF2 also checks, based on a type-2 originating 101 received in a P-Charging-Vector header that is based on an interconnection agreement with the originating network operator, that an inter-operating accounting is arranged correctly.

Because the "calling party pays" is the basis for the scenario illustrated in FIG. 3 and FIG. 4, no CCR session is initiated at this point of session setup by S-CSCF2.

In step 5, the UE-B receives the INVITE request with the reserved resources (message 9).

In step 6, when the resource reservation is confirmed, UE-B alerts the called user of the reserved resources. The user accepts the call and offers to take over a portion of the call charges, e.g. the called user makes an SPC offer.

In this example, the SPC request may be sent in a final answer (step 7), allowing the IMS network/the terminating S-CSCF, only to terminate the session setup in a way that first, the setup is completed (messages 16-22) and the setup session is subsequently immediately released (messages 23-29).

The Reason header in the BYE request can be used to carry the information that the session was to be released already during setup. Handling this information may be important for the calling user's charging. Here the S-CSCF has to report zero used units. Above this, signaling the specific content received in the Reason header may be needed as well to ensure that the session will be free of charge.

It is to be understood that in the aforementioned embodiments of the present invention, the steps are performed in the sequence and manner as shown although the order of some steps and the like may be changed without departing from the spirit and scope of the present invention.

Figure 5:
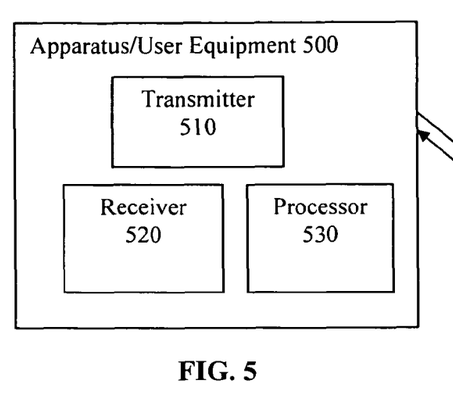
FIG. 5 illustrates an apparatus configured to initiate a call with a SPC offer according to an embodiment of the present invention.

FIG. 5 illustrates an apparatus configured to initiate a call with a SPC offer according to an embodiment of the present invention.

Referring to FIG. 5, an apparatus 500 includes a transmitter 510, a receiver 520, and a processor 530.

Transmitter 510 is configured to transmit a SIP message from the party initiating a SPC request. The SIP message may include a SPC offer request. The SPC offer request may include a request for an offer from the called party to take over a portion or all of the charges for a media component. A SPC ratio may be between 0% to 100% denoting the amount of charges to be covered for a media component, where 0% denotes that the calling party pays all charges associated with the media component and 100% denotes that the called party pays all charges associated with the media component. A parameter "payload" may be omitted from the SPC offer as the default value is considered to "Not Relevant."

Receiver 520 is configured to receive a SPC answer from the user equipment of the other party. The SPC answer may be included into a SIP request or response message which includes the other party's response to the calling party's SPC offer request described above. The SPC answer may include information regarding whether the called party accepted the call, whether the SPC offer request was accepted, and whether the SPC ratio was changed by the called party, e.g. whether the SPC ratio was increased or decreased and whether the participating telecom networks have accepted, approved, the agreed the charging split.

Processor 530 is configured to process the SPC answer and presents the SPC answer to the party invoking the SPC service, informing this party whether the SPC offer request was accepted, and whether the SPC ratio was changed by the called party, e.g. whether the SPC ratio was increased or decreased and whether the participating networks have accepted, approved, and agreed on the charging split.

Figure 6:
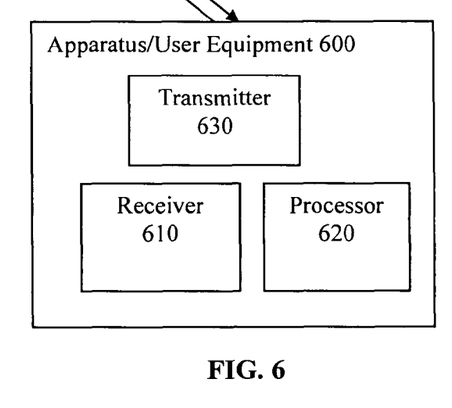
FIG. 6 illustrates an apparatus configured to accept a call with a SPC offer according to an embodiment of the present invention.

FIG. 6 illustrates an apparatus configured to accept a call with a SPC offer according to an embodiment of the present invention.

Referring to FIG. 6, an apparatus 600 includes a receiver 610, a processor 620, and a transmitter 630.

Receiver 610 is configured to receive a SIP request or response message transmitted from a user equipment of the party requesting SPC. The SIP message may include a SPC offer request. The SPC offer request may include a request for/from the called party to take over a portion or all of the charges for a media component. A SPC ratio may be between 0% to 100% denoting the amount of charges requested by the calling unit to be covered for a media component, where 0% denotes that the calling party pays all charges associated with the media component and 100% denotes that the called party pays all charges associated with the media component. A parameter "payload" may be omitted from the SPC offer as the default value is considered to "Not Relevant."

The SIP message may also include SPC-related information based on authentication information, whereby the serving network assures the user that the charges will be levied (in both party's network) as agreed between the users via the SPC offer/answer.

Processor 620 is configured to store the SPC-related information for determining SIP signaling messages. Processor 620 is further configured to store SPC-related information—for the called party role—and alert the called user and present the SPC offer request only at a later point of session setup (after successful resource reservation). Processor 620 may further be configured to increase/decrease the charging split ratio or reject the SPC request autonomously (based on pre-configured data, e.g. telephone book entries defining to take-over charges completely from a certain caller).

Upon receiving a decision from the called party regarding acceptance of the call, processor 620 is further configured to create a SIP message (e.g. an UPDATE request) for the sole purpose of SPC negotiation, which message shall include the SPC answer and a modified SPC ratio.

Transmitter 630 transmits the SIP message with the SPC answer to the user equipment of the calling party for completing a session setup/session modification between the calling party and the called party.

In accordance with an embodiment of the present invention, the apparatus may include any type of mobile or non-mobile user equipment, but not limited to, a mobile station, a laptop, a wireless transmit/receive unit, a fixed or mobile subscriber unit, a mobile telephone, a computer (fixed or portable), a pager, a person data assistant or organizer, or any other type of user equipment.

The many features and advantages of the invention are apparent from the detailed specification and, thus, it is intended by the appended claims to cover all such features and advantages of the invention which fall within the true spirit and scope of the invention. Further, since numerous modifications and changes will readily occur to one having ordinary skill in the art, it is not desired to limit the invention to the exact construction and steps illustrated and described, and accordingly all suitable modifications and equivalents may be resorted to, falling within the scope of the invention.

I claim:

1. A method, comprising:
   receiving a first message from a user equipment, the first message comprising one of a multimedia call setup and a call modification initiation request, a split charging offer request, and a first split charging ratio;
   processing the first message;
   determining whether a network element of an Internet protocol multimedia subsystem accepted and approved the service usage for allowing a group of users to negotiate which user will be charged for each component of a system;
   alerting a user of one of the multimedia call setup and the call modification initiation request, the split charging offer request, and the first split charging ratio;
   processing a user response to one of the multimedia call setup and the call modification initiation request, the split charging offer request, and the first split charging ratio from the user; and
   transmitting a second message to the user equipment,
   wherein the second message indicates whether the user accepts one of the multimedia call setup and the call modification initiation request, whether the user accepts the split charging offer request or the user increases or decreases the first split charging ratio.

2. The method of claim 1, wherein the receiving comprises receiving the split charging offer request comprising a request for the user to take over at least a portion of charges associated with each component of the system.

3. The method of claim 1, wherein the receiving comprises receiving the split charging offer request at a session setup or a session modification between a caller and the user of the user equipment.

4. The method of claim 1, wherein the receiving the first split charging ratio comprising a ratio of 0 to 100%, wherein 0% denotes that the user pays no charges associated with a component of the system, and wherein 100% denotes that the user pays all charges associated with the component of the system.

5. The method of claim 1, wherein the processing the first message comprises authenticating preconditions in the first message associated with resource reservations defined in the user equipment.

6. The method of claim 5, wherein the alerting comprises forwarding the first message to the user upon confirmation of the resource reservations.

7. The method of claim 1, wherein the processing the first message comprises storing split charging-related information for determining session initiation protocol signaling messages.

8. An apparatus, comprising:
   a receiver configured to receive a first message from a user equipment, the first message comprising one of a multimedia call setup and a call modification initiation request, a split charging offer request, and a first split charging ratio;
   a processor configured to: process the first message;
   a determination of whether a network element of an Internet protocol multimedia subsystem accepted and approved a second split charging ratio for allowing a group of users to negotiate which user will be charged for each component of a system;
   alert a user of one of the multimedia call setup and a call modification initiation request, the split charging offer request, and the first split charging ratio; and
   process a user response to one of the multimedia call setup and a call modification initiation request, the split charging offer request, and the first split charging ratio from the user;
   and the apparatus further comprises a transmitter configured to transmit a second message to the user equipment,
   wherein the second message indicates whether the user accepts one of the multimedia call setup and a call modification initiation request, whether the user accepts the split charging offer request or the user increases or decrease the first split charging ratio.

9. The apparatus of claim 8, wherein the split charging offer request comprises a request for the user to take over at least a portion of charges associated with each component of the system.

10. The apparatus of claim 8, wherein the receiver is configured to receive the split charging offer request at a session setup or a session modification between a caller and the user of the user equipment.

11. The apparatus of claim 8, wherein the first split charging ratio comprises a ratio of 0 to 100%, wherein 0% denotes that the user pays no charges associated with a component of the system, and wherein 100% denotes that the user pays all charges associated with the component of the system.

12. The apparatus of claim 8, wherein the first message comprises authenticating preconditions associated with resource reservations defined in the user equipment, and further comprises split charging-related information for determining session initiation protocol signaling messages.

* * * * *